United States Patent
Kreppel

(10) Patent No.: US 6,574,201 B1
(45) Date of Patent: Jun. 3, 2003

(54) METHOD AND MOBILE RADIO TELEPHONE NETWORK FOR HANDLING A PACKET DATA SERVICE

(75) Inventor: Jan Kreppel, Penzberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/347,339

(22) Filed: Jul. 2, 1999

(30) Foreign Application Priority Data

Jul. 6, 1998 (DE) ......................................... 198 30 164
Oct. 27, 1998 (DE) ......................................... 198 49 540

(51) Int. Cl.$^7$ ................................................. H04Q 7/00
(52) U.S. Cl. ....................................... 370/328; 370/437
(58) Field of Search ................................. 370/310, 328, 370/351.3, 389, 401, 431, 464–469, 442, 337, 347, 321; 455/403, 436, 433, 445, 461, 426

(56) References Cited

U.S. PATENT DOCUMENTS

| | | | | | |
|---|---|---|---|---|---|
| 6,091,949 | A | * | 7/2000 | Sanchez | 340/825.49 |
| 6,091,953 | A | * | 7/2000 | Ho et al. | 455/432 |
| 6,104,929 | A | * | 8/2000 | Josse et al. | 370/379 |
| 6,163,701 | A | * | 12/2000 | Saleh et al. | 455/422 |
| 6,272,450 | B1 | * | 8/2001 | Hill et al. | 370/241 |
| 6,415,151 | B1 | * | 7/2002 | Kreppel | 370/338 |
| 6,421,707 | B1 | * | 7/2002 | Miller et al. | 709/206 |

OTHER PUBLICATIONS

Digital cellular telecommunications system (Phase 2+); General Packet Radio Service (GPRS).
Digital cellular telecommunications system (Phase 2+) Customized Applications for Mobile network Enhanced Logic.

* cited by examiner

Primary Examiner—David Vincent
(74) Attorney, Agent, or Firm—Bell, Boyd & Lloyd LLC

(57) ABSTRACT

A method and mobile radiotelephone network for handling a packet data service wherein, proceeding from the handling of a packet data service in a mobile radiotelephone network by a service node in conjunction with an access node for the transmission of packet data, an interworking of the packet data service occurs with network functions of an intelligent network whereof a service switching function is interconnected with the service node, and a service control function is connected via an interface to the service node with integrated service switching function. It is only the interworking with integration of the service switching function in the service nodes that the handling of the packet data service via IN functions can be achieved at all, this having the advantage of an identical service handling like all other IN services. The newly created interface for the interworking between service node with integrated service switching function and service control function thereby supports the uniform service handling which can, thus, be applied both for packet-oriented communication and for connection-oriented communication.

23 Claims, 3 Drawing Sheets

METHOD AND MOBILE RADIO TELEPHONE NETWORK FOR HANDLING A PACKET DATA SERVICE

BACKGROUND OF THE INVENTION

1. Field of the Invention

The present invention is directed to a method and to a mobile radio telephone network for handling a packet data service wherein an interface created for the interworking between a service node and both an integrated service switching function and a service control function supports uniform service handling which can be applied both for packet-oriented communication and connection-oriented communication.

2. Description of the Prior Art

As is known, it is possible to have connections controlled by an intelligent network (IN) for connection-oriented communication services in a communication network. For example, a CAMEL platform (customized applications for mobile network enhanced logic) is thus defined according to the GSM Recommendation 03.78 for mobile radio telephone networks according to the GSM standard (global system for mobile communication) in order to enable a worldwide use of the performance features of the intelligent network. The standard architecture of the intelligent network provides both a service switching function and a service control function that are connected to one another via a signaling link. A specific protocol that is composed of the CAP protocol (CAMEL application part) for the mobile radio telephone network is thereby employed.

New data services such as the packet data service GPRS (general packet radio service) according to GSM Recommendation 03.60 currently are being currently introduced in existing mobile radio telephone networks according to the GSM standard. The transmission in the mobile radio telephone network thereby does not occur connection-oriented, but occurs in the form of packet data. The advantage of packet-oriented transmission is that the given transmission resources in the mobile radio telephone network can be utilized better. The network architecture for the packet data service provides that the communication terminal equipment used by the mobile subscriber, the mobile station, is serviced at its respective location by a service network node (serving GPRS support node). Access to a packet data network is necessary in order to receive or send packet data. To this end, one or more access network nodes (gateway GPRS support nodes) are offered that respectively allows for this access to the packet data network (for example, the Internet) and support a specific packet data protocol (for example, Internet protocol). The packet data transmission occurs via a tunnel which is provided between the service network node and the access network node. It is currently not possible to support the packet data transmission according to the packet data service with the standard IN architecture.

An object of the present invention is, therefore, to specify a method and a mobile radio telephone network with which a handling of the packet data service for packet data transmission is enabled via an IN architecture.

SUMMARY OF THE INVENTION

Accordingly, proceeding from the handling of a packet data service in the mobile radio telephone network by a service network node in conjunction with an access network node for the transmission of packet data, the present invention promotes an interworking of the packet data service with network functions of an intelligent network whereof a service switching function is interconnected with the respective service network node and a service control function is connected via an interface to the service network node with integrated service switching function. Only by the interworking with integration of the service switching function into the service network node can the handling of the packet data service be achieved. This has the advantage of a service handling identical to all other IN services. The newly-created interface for the interworking between service network node with integrated service switching function and service control function thereby supports the uniform service handling that can be applied for packet-oriented communication as well as for connection-oriented communication. Over and. above this, the interworking of the service switching function of the intelligent network into the service network node yields the advantage that the subscriber-related data needed for handling the service (such as, for example, the location of the mobile station, the identification data, etc.) can be made directly available to the service switching function from the service network node, and not via "detours."

Pursuant to an embodiment of the present invention, the service switching node with integrated service switching function uses a plurality of statusses according to a status model for handling the packet data service, and status changes between the statusses are interpreted for the interworking with the network functions of the intelligent network.

According to another embodiment of the present invention, messages for the implementation of operations for the packet data service are sent and received via the interface between service switching function and service control function.

It also has proven to be beneficial to use certain events as trigger points for the packet data service for opening up a communication between service switching function and service control function. Over and above this, events also can be employed as detection points for the packet data service whose occurrence is respectively reported by the service switching function integrated in the service network node.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
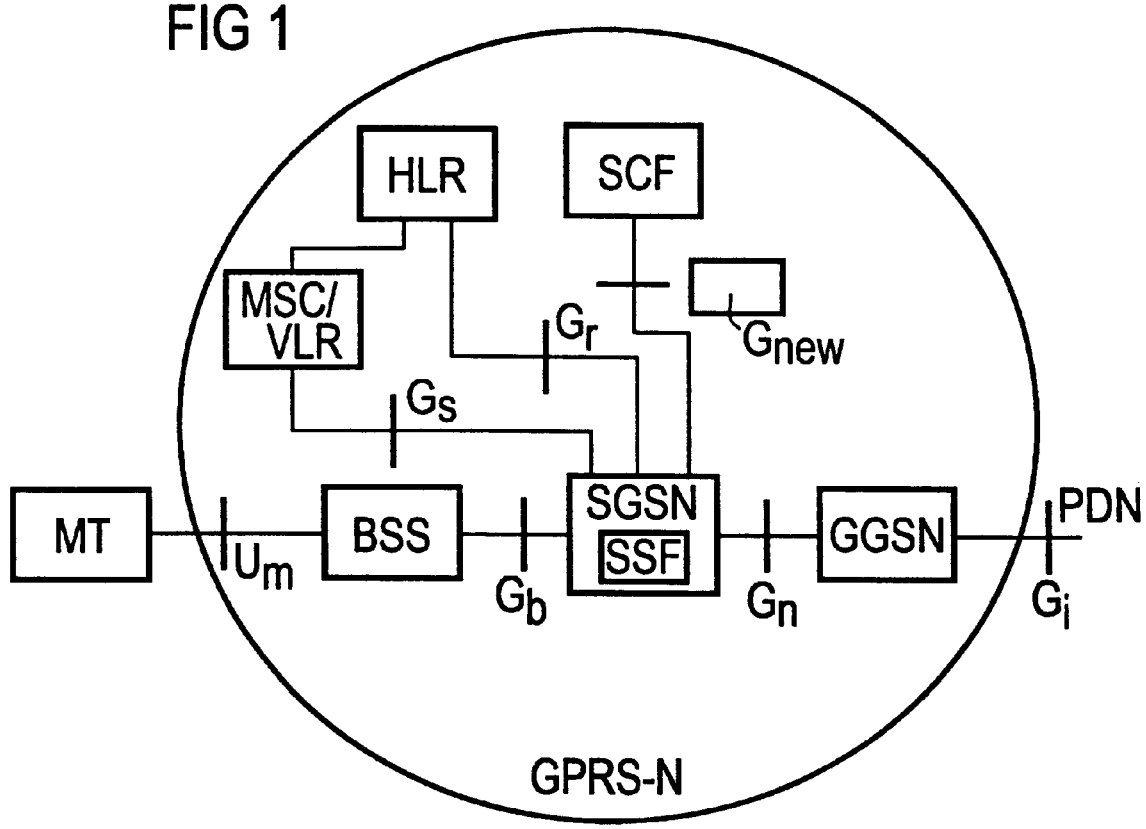
FIG. 1 shows the block circuit diagram of a mobile radio telephone network for handling the packet data service according to the present invention.

The block circuit diagram of FIG. 1 shows the network architecture of a mobile radio telephone network GPRS-N for handling a packet data service GPRS (General Packet Radio Service). As is known, the communication terminal equipment MT, the mobile station, of a mobile subscriber is wirelessly coupled to the mobile radio telephone network GPRS-N via an air interface Um; i.e., to the base station system BSS thereof with stationary base stations and base station controls. For the transmission of packet data between the mobile station MT and a packet data network PDN, the mobile radio telephone network GPRS-N includes a service network node SGSN and an access network node GGSN. The access network node GGSN is connected via an interface Gi to the packet data network PDN, whereas the service network node SGSN is connected to the base station system BSS via an interface Gb. In addition to the base station system BSS, a switching system with, usually, a plurality of mobile switching centers and subscriber databases is provided in the mobile radiotelephone network GPRS-N. In the present example, a mobile switching center MSC with appertaining subscriber data base VLR is coupled to the service network node SGSN via an interface Gs and a central subscriber data base HLR is connected to the service network node SGSN via an interface Gr. The subscriber data bases VLR, HLR formed as registers, contain the subscriber and service data of the mobile subscriber, dependent on the location of his mobile station MT.

In order to be able to handle the packet data service such as an IN service, an interworking of the packet data service occurs with network functions of an intelligent network (IN) such that a service switching function SSF is interconnected with the service network node SGSN and a service control function SCF is connected via a new interface Gnew to the service network node SGSN with integrated service switching function SSF. Since the service network node SGSN has the necessary subscriber-related data available to it (such as, for example, the current location, the identification data, etc.), it is the optimum location for merging the functions of the packet data service and the IN functions in the mobile radiotelephone network GPRS-N. A packet relay that, among other things, images the interface Gb to the base station system BSS onto the interface Gn to the access network node GGSN and vice versa, and that forwards the data packets in both directions is located in the service network node SGSN. Over and above this, this packet relay controls the mobility management (for example, for the packet data service GPRS here), and is conceptually used for the integration of the service switching function SSF in the service network node SGSN.

The following mechanisms may be the IN services, including the packet data service:

Personally allocated IN services that are entered in the subscriber data base;

Permanently allocated IN services; or

IN services activated by the subscriber himself; for example, via a parameter profile.

Initially, there is no connection in the network for the packet data service. In order to use the service, the mobile subscriber must first log on: in the network, as in the case of connection-oriented services as well. On this occasion, the subscriber's identity and authorization are checked. In the second step, a packet data protocol must be activated. The network GPRS-N now establishes a tunnel between the service network node SGSN and the access network node GGSN to the packet data network PDN. As a result, packets can be exchanged between the subscriber and the packet data network. The totality of statusses of a mobile subscriber with respect to the packet data service GPRS is referred to below as "session".

Figure 2:
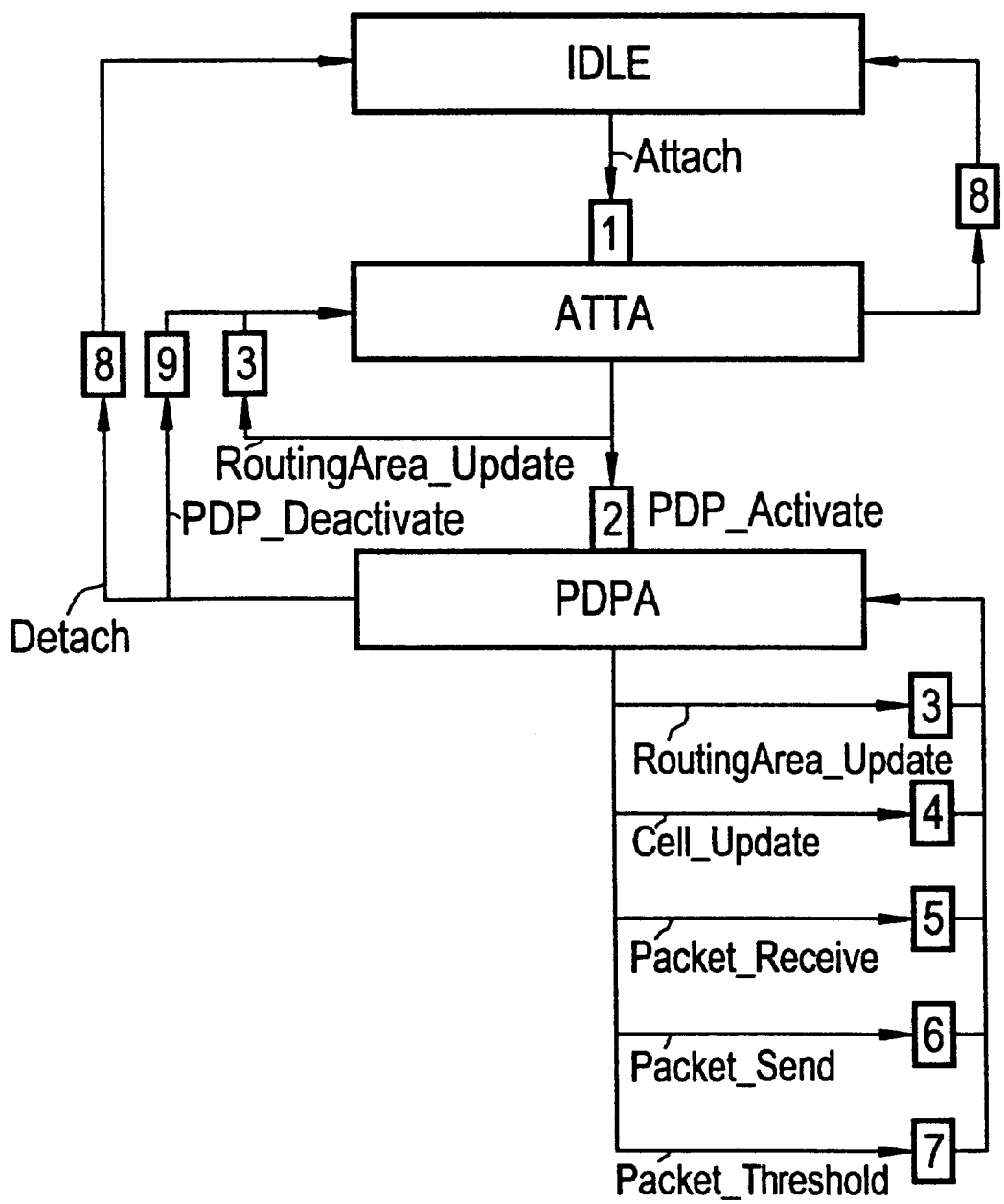
FIG. 2 shows the block circuit diagram of a status model for handling the packet data service in the service network node with integrated service switching function.

In a block circuit diagram, FIG. 2 shows the status model for handling the packet data service SGSN with integrated service switching function SSF according to FIG. 1. This status model is derived from the "session" of a mobile subscriber and includes a plurality of statusses for the mobile station MT of the mobile subscriber that must be interpreted for the interworking with the network functions of the intelligent network. The change to a new service network node SGSN if the subscriber leaves the coverage area of an old service network node SGSN thereby represents a special situation. The following statusses are to be distinguished:

IDLE

In this status, the mobile station is not checked-in in the mobile radiotelephone network. The switch into a status ATTA (attached) (see below), is achieved by a successful check-in. The IDLE status can be reached from the statuses ATTA and a further status PDPA (Packet Data Protocol ACTIVE) (also see below) by checking out from the network.

ATTA

This status is reached when the mobile station successfully checks in. The status PDPA is reached by activating a packet data protocol. The status IDLE is reached by checking out from the network. The updating of the location on the basis of a routing area is also possible in the status ATTA. These latter events do not lead to a change in status.

PDPA

This status is reached when a packet data protocol was successfully activated by the mobile station. The status IDLE is reached by checking out from the network. Moreover, the updating of the location on the basis of a cell area or, respectively, of a routing area is possible in the status PDPA. These latter events do not lead to a change in status. Further events that do not cause a change in status are the sending or receiving of a packet as well as exceeding a threshold for sent and/or received packets.

These status changes are used for an interworking between the service network node (SGSN, see FIG. 1) with the integrated service switching function (SSF, see FIG. 1) and the service control function (SCF, see FIG. 1). Trigger points (trigger detection points, TDP) are required for commencing a communication, for example a control and monitoring relationship, between service switching function and service control function. The following events are preferably used as trigger points:

Attach: a subscriber or, respectively, his mobile station logs on in the GPRS mobile radiotelephone network, which produces the change from the status IDLE to the status ATTA.

PDP_Activate: a subscriber or, respectively, his mobile station activates a packet data protocol, which causes the change from the status ATTA to the status PDPA.

All trigger points are possible both in a request mode as well as in a notification mode.

The following events are employed as event detection points (EDP) for the packet data service, these defining actions of the mobile subscriber or, respectively, his mobile station and a message from the service switching function (SSF) being respectively initiated when they occur:

PDP_Activate: a subscriber activates a packet data protocol.

RoutingArea_Update: a subscriber moves into a new routing area.

Cell_Update: a subscriber moves into a new radio cell.

Packet_Receive: a subscriber receives at least one data packet.

Packet_Send: a subscriber sends at least one data packet.

Packet_Threshold: the arriving and/or departing data packets of a subscriber exceed a previously defined threshold.

Detach: a subscriber logs off in the GPRS mobile radiotelephone network.

PDP_Deactivate: a subscriber deactivates a packet data protocol.

The event points are thereby first "armed" by the service switching function (SSF); i.e., the service control function (SCF) initiates them to report the occurrence of a specific event. All event points can be armed both in the request as well as in the notification mode.

Specific operations are implemented via the new interface between service switching function (SSF) and service control function (SCF). A distinction is made between an initiating entity and a responding entity in every operation. The operations can be implemented on the basis of CCS7 signalling in the same way as in the connection-oriented transmission of voice signals. However, any other type of signalling is possible; for example, the message exchange can occur on the basis of Internet protocol (IP), etc.

The following messages are provided for an interworking between packet data service GPRS and intelligent network:

IDP (InitialDetectionPoint)

This message serves the purpose of initiating the control of monitoring relationship between service switching function (SSF) and service control function (SCF) with respect to a GPRS subscriber. The message is triggered when a trigger point is reached. Specific prerequisites preferably also must be met for the IDP operation to be triggered. There are various possibilities therefor:

The appertaining event (for example, Attach) occurs, and it is permanently set in the service network node (SGSN) that an SSF/SCF association is to be opened up. Suitable data, the trigger profiles, are deposited therefor in the database of the service network node (SGSN), wherein the address of the service switching function (SSF) as well as data that address the service is capable of being taken therefrom.

The appertaining event (for example, Attach) occurs, and it proceeds from the subscriber profile, which is interrogated by the HLR, then an SSF/SCF association is to be opened up. Suitable data therefor (see above) are deposited within the subscriber profile (for example, service indication as defined in CAMEL).

The appertaining event (for example, RoutingArea_Update) occurs, and it derives from the subscriber context data, which are interrogated by the old SGSN when switching to a new SGSN, that an SSF/SCF association is to be opened up. Suitable data therefor (see above) are deposited within the subscriber profile (for example, service indication as defined in CAMEL).

The appertaining event (for example, PDP_Activate) occurs, and it proceeds from the parameters of the messages at the interface to the base station system ($G_b$ interface) that a specific IN service is to be activated. The required service parameters are taken from a profile deposited in the SGSN (see 1.). Suitable parameters for the service selection must be accepted into the corresponding messages of the existing GPRS standard (for logon or, respectively, activation of a packet data protocol). Parameters that already exist, such as, for example, the type of a packet data protocol provided for the transmission of the packet data or the address of the requested access network node of the mobile radiotelephone network, also can be used.

When one of the aforementioned conditions is met, the service switching function, (SSF) initiates the IDP operation by sending a message. The message includes the following parameters:

subscriber identifier (IMSI) for the identification of the subscriber;

an identifier (PDPContextIdentifier) of the respective packet data transmission;

location (=cell identification) of the subscriber;

type of trigger point;

requested packet data protocol type (PDP type);

requested access point (GGSN address or name);

requested quality of service (QoS); and identification of the service (service key).

The datum PDPContextIdentifier allows the service control function (SCF) to make an unambiguous identification of a packet "session" in the GPRS mobile radiotelephone network. This is necessary when, for example, a plurality of packet data transmissions and, thus, a plurality of SCF/SSF associations exist for one subscriber.

When it is a matter of a trigger point in the request mode, then the service control function (SCF) is called upon to decide about the allowability of the requested action; for example, activation of a packet data protocol. One of the following operations "GRA" or "REJ" is employed for this purpose.

GRA (Grant)

This operation is employed by the service control function SCF in order to instruct the service switching function SSF to allow a requested action; for example, activation of the packet data protocol. The operation is initiated by sending a message. Parameters include allowable quality of service; and identification of an access point (=GGSN address or name).

The service switching function SSF or, respectively, the service network node SGSN then continues the processing in that, for example, a packet data protocol is activated. Parameters of the grant operation are thereby taken into consideration; i.e., the subscriber potentially only receives the quality of service defined by the service control function SCF, and the access to the packet data network occurs via the access node GGSN defined by the service control function SCF.

REJ (Reject)

This operation is employed by the service control function SCF in order to instruct the service switching function SSF to not allow a certain action. The action is initiated by sending a message. Parameters include Cause of the Rejection (Reject Cause)

The service switching function SSF or, respectively, the service network node SGSN continues the processing in that the desired action is rejected or, respectively, the packet data protocol is deactivated by the network. To that end, it is necessary to send a corresponding message to the interface to the MS, as provided in the protocol (GPRS mobility management: Attach Reject, Routing Area Update Reject, GPRS Session Management: Activate PDP Context Reject, Deactivate PDP context request). The cause of the rejection can be imaged onto the corresponding parameters of the aforementioned notifications to the mobile station.

RRBE (RequestReportBSSMEvent)

This operation is employed by the service control function SCF in order to instruct the service switching function SSF to monitor a specific event and to report the occurrence of the event (see below, ERB operation). The operation is initiated by sending a message. Parameters include type of event to be monitored, and
if the event "Packet_Threshold" is armed:
  height of the threshold,
  type of threshold (number of bytes, number of packets),
  time interval for monitoring the threshold,
  counting method (since the beginning of the transmission, reset at every overflow, set to zero upon receipt of the count instruction),
  direction (incoming, outgoing, both directions), and
  required reaction given transgression (abort of the transmission, merely notification).

The service switching function SSF then reports with ERB (EventReportBSSM) given occurrence of said event.

ERB (EventReportBSSM)

This operation is employed by the service switching function SSF in order to report the occurrence of a previously armed event to the service control function SCF. The operation is initiated by sending a message. Parameters include
  type of event, and
  if the event "Packet_Threshold" is reported: height of the current count reading.

The service control function SCF registers the event and potentially sends further instructions.

CAA (CancelAssociation)

This operation serves the purpose of ending an association with a service switching function SSF. The operation is necessary in conjunction with the switch to a new SGSN or, respectively, a new service switching function SSF. It is possible to interrogate the terminating status of the packet session from the service switching function SSF. Parameters are:
  answerback of the terminating status (yes/no).

The service switching function potentially responds with CAR (CancelAssociationResponse).

CAR (CancelAssociationResponse)

This operation serves the purpose of confirming the cancellation of an association to a service control function SCF and reporting the terminating status to the service control function SCF. Parameters are:
  status: packet counter readings for armed threshold.

The service control function SCF registers the status and potentially gives instructions to the service switching function SSF upon entry into the new SGSN.

An example of the application of the inventive interworking between the packet data service GPRS and the IN functions for identical handling of all services refers to a prepaid service of the packet data transmission. This prepaid service is realized via the intelligent network IN. The subscribers who use this service via corresponding card agreements also can be offered new data services; i.e., packet transmissions must be charged via the IN service in this case.

Figure 3:
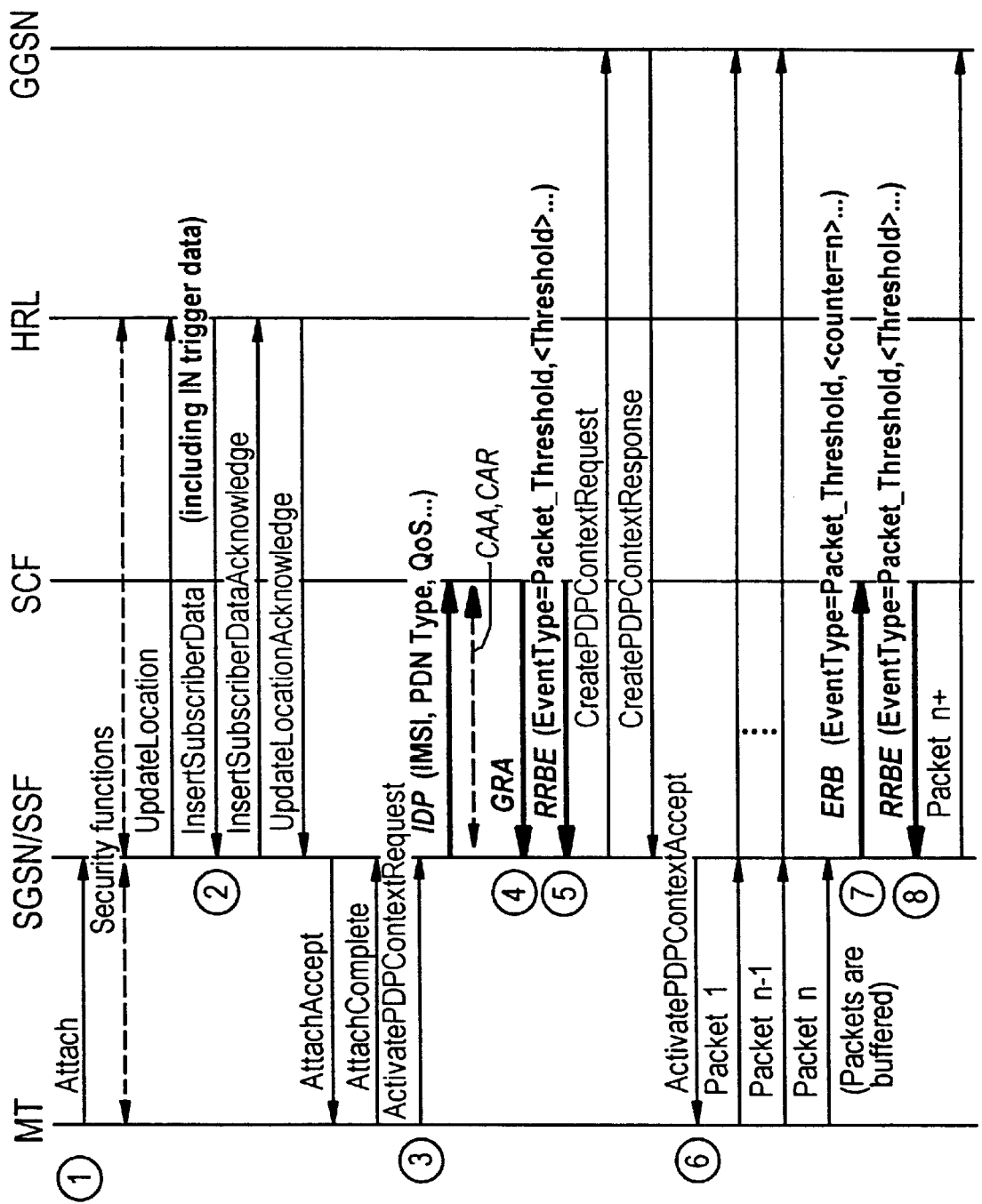
FIG. 3 shows the message flow between the network equipment with reference to the example of a prepaid billing by means of IN function given transmission of packet data according to the packet data service.

FIG. 3 shows the exemplary message flow between mobile station MT, service network node SGSN with integrated service switching function SSF, service control function SCF, subscriber database HLR and access node GGSN on the basis of successive steps (1) through (8) that are explained below.

(1): The mobile station MT logs on at the GPRS mobile radiotelephone network and sends its identification data (attach, security functions) to the service node SGSN via the base station system. As a result, the mobile station MT is authenticated in the network via the subscriber database in a known way according to the GSM standard, whereby corresponding data are exchanged with the mobile station MT via the service node SGSN and the base station system.

(2): In response to a request message (Update Location) of the service node SGSN, the subscriber database HLR sends the subscriber data (InsertSubscriberData) and subsequently receives an acknowledge message (InsertSubscriberDataAcknowledge) from the service node SGSN with which the arrival of the requested subscriber data is acknowledged. The subscriber data also contains trigger data (IN trigger data) from which it proceeds that the subscriber is making use of a personal IN service, such as the prepaid service in the present example.

The subscriber database HLR responds to the request for data by sending out an acknowledge message (UpdateLocationAcknowledge) to the service node SGSN. The check-in event is implemented by sending a message (Attach Accept) from the service node SGSN to the mobile station MT and by sending a different message back (Attach Complete) from the mobile station MT to the service node SGSN.

(3): Via the mobile station MT, the subscriber attempts to activate a packet data protocol with a message (ActivatePDPContextRequest). As a result of the allocation of an IN service in the subscriber database HLR, this leads thereto that an IN dialogue is initiated. The service switching function SSF thereby sends the message IDP (initial detection point) to the service control function, the subscriber identity IMSI, the desired IN service as well as the data PDP type. QoS, among other things, is transmitted therein for the requested packet data protocol.

When an association existed between service control function SCF and service switching function SSF and a switching of this association from an old service node to a new service node SGSN has occurred and is recognizable based on the message IDP, the service control function SCF then ends the previous association to the old service node by triggering a message CAA (CancelAssociation). The old service node acknowledges the end of the association by triggering or, respectively, sending a message CAR (CancelAssociationResponse), whereby all status data of the association are also sent.

(4): The service control function SCF checks whether the subscriber has the authorization to activate the packet data protocol with the requested quality of service and whether the subscriber's account has-enough coverage. When this is the case, then service control function SCF sends the message GRA to the service switching function SSF.

(5): The service control function sets a first threshold for data packets in that it sends the message RRBE (RequestReportMSSMEvent) to the service switching function SSF wherein, among other things, the detection point Packet_Threshold and the threshold Threshold for the arriving/departing data packets are defined.

(6): The activation of the packet data protocol begins in that the messages CreatePDPContextRequest, CreatePDPContextResponse are transmitted between the service node SGSN and the access node GGSN. An acknowledgment to the mobile station MT follows in the message ActivatePDPContextAccept that is initiated by the service node SGGN and forwarded via the base station system. The packet transmissions in the direction from the mobile station MT to the service node SGSN and from the service node SGSN to the access node GGSN start, beginning with a packet 1 up to a packet n. The arriving packets are thereby intermediately stored in the service node SGSN.

(7): Let it be assumed that the threshold is reached after the transmitted packet n. The service switching function SSF therefore interrupts the forwarding of the packets to the access node GGSN and reports the event with the message ERB (EventReportBSSM) to the service control function SCF. The message ERB includes the event point Packet_Threshold and a counter reading counter=n as parameters.

(8): The service control function SCF subsequently implements an intermediate charging for the packets previously transmitted. The calculation of the charges occurs on the basis of the reported volume, whereby a fee schedule model is applied that determines the price per volume unit (for example, kilobyte) taking further criteria into consideration such as, for example, day of the week and time of day as well as the distance between mobile station MT and the access node. Insofar as the subscriber account continues to exhibit enough coverage, the service switching function SSF sets a new threshold Threshold and sends it to the service control function SCF together with the event point Packet_Threshold in the message RRBE (RequestReportBSSMEvent). The packet transmission can be continued by the service node SGSN in that further packets n+ are sent to the access node GGSN. When there is, no longer any coverage of the account, the service control function SCF sends the message REJ (reject). The service switching function then effects the deactivation of the packet data protocol and signals this to the mobile station MT. In this case, further packets are discarded by the service node SGSN and are not forwarded.

Although the present invention has been described with reference to specific embodiments, those of skill in the art will recognize that changes may be made thereto without departing from the spirit and scope of the invention as set forth in the hereafter appended claims.

I claim:

1. A method of handling a packet data service in a mobile radio telephone network via an intelligent network for the transmission of packet data to and from a communication terminal of a subscriber of the mobile radio telephone network, the method comprising the steps of:
    connecting, via an interface, a service network node of the mobile radio telephone network to an access node interconnected to a packet data network;
    incorporating a service switching function of the intelligent network in the service network node of the mobile radio telephone network; and
    connecting a service control function of the intelligent network to the service network node.

2. The method of handling a packet data service in a mobile radio telephone network as claimed in claim 1 wherein the step of integrating the network functions of the intelligent network into the packet data service further includes:
    establishing a status model for handling the packet data service network node, the status model including plurality of statuses; and
    interpreting status changes between the plurality of statuses.

3. A method for handling a packet data service in a mobile radio telephone network as claimed in claim 1, further comprising the step of:
    using specific events as trigger points for the packet data service for opening up a communication between the service switching function and the service control function.

4. A method for handling a packet data service in a mobile radio telephone network as claimed in claim 3, wherein one of the events comprises a check-in of the subscriber's communication terminal into the mobile radio telephone network.

5. A method for handling a packet data service in a mobile radio telephone network as claimed in claim 3, wherein one of the events comprises of an activation of a packet data protocol by the subscriber's communication terminal.

6. A method for handling a packet data service in a mobile radio telephone network as claimed in claim 1, further comprising the step of:
    using parameters existing in the packet data network as trigger points for the packet data service for opening up a communication between the service switching function and the service control function.

7. A method for handling a packet data service in a mobile radio telephone network as claimed in claim 6, wherein the parameters include at least one of the packet data protocol provided for the transmission of the packet data and an address of the access node of the mobile radio telephone network.

8. The method of handling a packet data service in a mobile radio telephone network of claim 1 further comprising the steps of:
    using specific events as event points for the packet data service; and
    reporting occurrences of the specific events by the service switching function incorporated in the service node.

9. The method for handling a packet data service in a mobile radio telephone network as claimed in claim 1, wherein the step of integrating the network functions of the intelligent network into the packet data service further comprises the steps of:
    sending and receiving a plurality of messages between the service control function and the service switching function.

10. A method for handling a packet data service in a mobile radio telephone network as claimed in claim 9, further comprising the step of:
    triggering one of the plurality of messages when a trigger point is reached, wherein one of the plurality of messages is for opening up an association between the service switching function and the service control function.

11. A method for handling a packet data service in a mobile radio telephone network as claimed in claim 10, further comprising the step of:
    determining whether the one of the plurality of messages for opening up an association is triggered on the basis of subscriber data respectively stored for a mobile subscriber in the mobile radio telephone network.

12. A method for handling a packet data service in a mobile radio telephone network as claimed in claim 10, further comprising the step of:
    determining whether the one of the plurality of messages for opening up an association is triggered on the basis of subscriber context data that is interrogated given a change from one service node to another service node.

13. A method for handling a packet data service in a mobile radio telephone network as claimed in claim 9, further comprising the step of:
    triggering, via the service control function, one of the plurality of messages to instruct the service switching function to allow a requested action.

14. A method for handling a packet data service in a mobile radio telephone network as claimed in claim 9, further comprising the step of:
    triggering, via the service control function, one of the plurality of messages for instructing the service switching function not to allow a requested action, wherein the third message contains at least a cause for rejecting the action as parameter.

15. A method for handling a packet data service in a mobile radio telephone network as claimed in claim 9, further comprising the step of:

triggering, via the service control function, one of the plurality of messages for instructing the service switching function to monitor a specific event and to report the occurrence of the event.

16. A method for handling a packet data service in a mobile radio telephone network as claimed in claim 15, further comprising the step of:

triggering, via the service switching function, another one of the plurality of messages for reporting the occurrence of the event to the service control function.

17. A method for handling a packet data service in a mobile radio telephone network as claimed in claim 9, further comprising the step of:

triggering, via the service control function, one of the plurality of messages for ending an association between the service control function and the service switching function.

18. A method for handling a packet data service in a mobile radio telephone network as claimed in claim 17, further comprising the step of:

triggering, via the service switching function, another one of the plurality of messages for acknowledgment of the end of the association to the service control function.

19. A method for handling a packet data service in a mobile radio telephone network as claimed in claim 9, further comprising the step of:

transmitting in the plurality of messages a plurality of parameters for a respective operation to be implemented.

20. A method for handling a packet data service in a mobile radio telephone network as claimed in claim 1, further comprising the step of:

applying the network functions of the intelligent network integrated into the packet data service, including the service control function and the service switching function incorporated in the service network node, to a prepaid service.

21. A mobile radio telephone network for handling a packet data service for transmission of packet data to and from a communication terminal of a mobile subscriber of the mobile radio telephone network, the mobile radio telephone network comprising:

a packet data network;

an access node; and a service node connected to the access node for interconnecting to the packet data network for the transmission of the packet data to and from the communication terminal, wherein the service node includes a service switching function and a service control function, the service control function connected via an interface to the service node with the integrated service switching function for the interworking of the packet data service with network functions of an intelligent network.

22. A mobile radiotelephone network for handling a packet data service for the transmission of packet data to and from a piece of communication terminal equipment as claimed in claim 21, wherein the interface is for transmission of a plurality of messages for implementation of operations according to the packet data service.

23. A mobile radiotelephone network for handling a packet data service for the transmission of packet data to and from a piece of communication terminal equipment as claimed in claim 22, wherein the plurality of messages respectively comprise a plurality of parameters for respective implementation of the operations.

\* \* \* \* \*